United States Patent
Milligan et al.

(10) Patent No.: US 9,311,083 B1
(45) Date of Patent: Apr. 12, 2016

(54) MACHINE INTERFACE CONFIGURATION SYSTEM FOR COERCED INCONSISTENCIES ON DIFFERENT MACHINE PLATFORMS

(71) Applicant: CypressX LLC, Seattle, WA (US)

(72) Inventors: Ryan Milligan, Seattle, WA (US); Parker Whittle, Seattle, WA (US)

(73) Assignee: CypressX LLC, Seattle, WA (US)

( * ) Notice: Subject to any disclaimer, the term of this patent is extended or adjusted under 35 U.S.C. 154(b) by 0 days.

(21) Appl. No.: 14/683,505

(22) Filed: Apr. 10, 2015

(51) Int. Cl.
*G06F 9/44* (2006.01)
*H04L 29/08* (2006.01)

(52) U.S. Cl.
CPC .............. *G06F 8/76* (2013.01); *H04L 67/1095* (2013.01)

(58) Field of Classification Search
USPC ................................................. 717/100–107
IPC ........................................ G06F 8/34,8/38, 8/76
See application file for complete search history.

(56) References Cited

U.S. PATENT DOCUMENTS

| | | | | |
|---|---|---|---|---|
| 6,601,233 B1 * | 7/2003 | Underwood | ................... | 717/102 |
| 6,789,252 B1 * | 9/2004 | Burke | ....................... | G06F 8/10 717/100 |
| 7,139,999 B2 * | 11/2006 | Bowman-Amuah | .......... | 717/101 |
| 7,140,000 B2 * | 11/2006 | Yucel | ........................... | 717/104 |
| 7,428,723 B2 * | 9/2008 | Greene | .......... | G06Q 10/0631 12 709/201 |
| 7,464,366 B2 * | 12/2008 | Shukla et al. | ................. | 717/100 |
| 7,552,418 B2 * | 6/2009 | Saad | ......................... | G06F 8/20 717/100 |
| 7,565,640 B2 * | 7/2009 | Shukla et al. | ................. | 717/105 |
| 7,617,479 B2 * | 11/2009 | Hambrick et al. | ............ | 717/104 |
| 7,669,177 B2 * | 2/2010 | Gerber | ................ | G06F 9/44505 707/705 |
| 7,730,446 B2 * | 6/2010 | Anonsen | ................ | G06Q 10/10 717/102 |
| 7,757,204 B2 * | 7/2010 | Fildebrandt | ............... | G06F 8/10 717/104 |
| 7,805,324 B2 * | 9/2010 | Green et al. | ................. | 705/7.27 |
| 7,873,940 B2 * | 1/2011 | Sanghvi | ................. | G06Q 10/06 717/102 |
| 7,962,892 B2 * | 6/2011 | Shaburov | .................. | G06F 8/34 717/105 |
| 8,375,351 B2 * | 2/2013 | Ahadian | ................... | G06F 8/24 717/101 |
| 8,566,777 B2 * | 10/2013 | Chaar | ....................... | G06F 8/20 717/101 |
| 8,751,626 B2 * | 6/2014 | Pinkston et al. | .............. | 709/224 |

OTHER PUBLICATIONS

Farre et al, "SVTe—A Tool to Validate Database Schemas giving Explanations", ACM, pp. 1-6, 2008.*
Moon et al, "PRIMA: Archiving and Querying Historical Data with Evolving Schemas", ACM, pp. 1019-1021, 2009.*

(Continued)

*Primary Examiner* — Anil Khatri
(74) *Attorney, Agent, or Firm* — FSP LLC (57) ABSTRACT

A method of operating a machine includes receiving via a network machine interface a schema defining a hierarchy of page objects for application logic on a plurality of different machine platforms. The schema is applied to operate shell logic specific to a particular machine platform including the network machine interface via which the schema was received to provide a look and feel for application logic native to the particular machine platform. Layout logic and navigation logic of the shell logic are operated cooperatively to cause the look and feel of the application logic native to the particular machine platform as defined by the hierarchy of page objects to be inconsistent on the plurality of different machine platforms.

17 Claims, 5 Drawing Sheets

(56) References Cited

OTHER PUBLICATIONS

Zaniolo, "A New Normal Form for the Design of Relational Database Schemata" ACM Transactions on Database Systems, vol. 7, No. 3, pp. 489-499, 1982.*

Zheng et al, "Determinacy and Rewriting of Conjunctive Queries Over Unary Database Schemas", ACM, pp. 1039-1044, 2011.*

Wu, "Normalization Design of XML Database Schema for Eliminating Redundant Schemas and Satisfying Lossless Join", IEEE, pp. 660-663, 2004.*

Khorasani et al, "CWJess: An Expert System Shell for Computing with Words", IEEE, pp. 396-399, 2011.*

* cited by examiner

MACHINE INTERFACE CONFIGURATION SYSTEM FOR COERCED INCONSISTENCIES ON DIFFERENT MACHINE PLATFORMS

CROSS-REFERENCE TO RELATED APPLICATIONS

Not Applicable.

BACKGROUND

Application logic is conventionally re-written for multiple different machine platforms, such as Xbox 360, X One, Fire TV, etc. in order to conform to look and feel requirements or preferences for each platform. This involves a large amount of work adapting each application, as the look and feel variations may include not only different layouts, but whole changes to which and how many screens, or pages, are displayed. The content and controls of the pages themselves may vary across different machine platforms, and the pages may behave differently when the user interacts with them.

All of these variations require enormous planning and effort on the part of programmers who are tasked with delivering applications on many different machine platforms. Conventional cross-platform technologies like Java and HTML simply cannot account for this wide range of application variations, as they are designed to deliver a consistent experience for users of the application on the different platforms, not to deliberately cause significant variations of the type described here in the application look and feel across machine platforms.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

Described herein are a machine system that utilizes a schema defining a hierarchy of page objects for application logic on a group of different machine platforms. The schema may be obtained from a configuration server and is specific to a particular application, but not a particular machine platform for the application. The schema is applied to operate shell logic specific to a particular machine platform. More particularly layout logic and navigation logic of the shell logic is configured to cooperate to cause the look and feel of the application logic native to the particular machine platform as defined by the hierarchy of page objects to be inconsistent on the group of different machine platforms. This is a very significant departure from conventional techniques such as web pages coded with HTML, which strive to maintain a consistent look and feel across different machine platforms. It is also a significant departure in that the look and feel being configured using different feeds for various different native applications, all utilizing the same shell logic to implement their look and feel.

In some embodiments, the machine system may include skin logic configured to operate in cooperation with the layout logic to cause the look and feel of the application logic native to the particular machine platform as defined by the hierarchy of page objects to be inconsistent on the group of different machine platforms. The shell logic may be configured to deliberately ignore variations between page types of the hierarchy of page objects. The schema may be configured to operate the shell logic to cause variations in the look and feel of the application logic native to the particular machine platform according to a mode of operation of the particular machine platform, such as a registered mode of operation of the particular machine platform and a snap mode of operation of the particular machine platform.

The schema may be configured to operate the shell logic to cause variations in the look and feel of the application logic native to the particular machine platform by displaying alternative content for different ones of the group of different machine platforms, and may further include alternative content for different ones of the group of different machine platforms, such as alternative page objects.

Drawings

Figure 1:
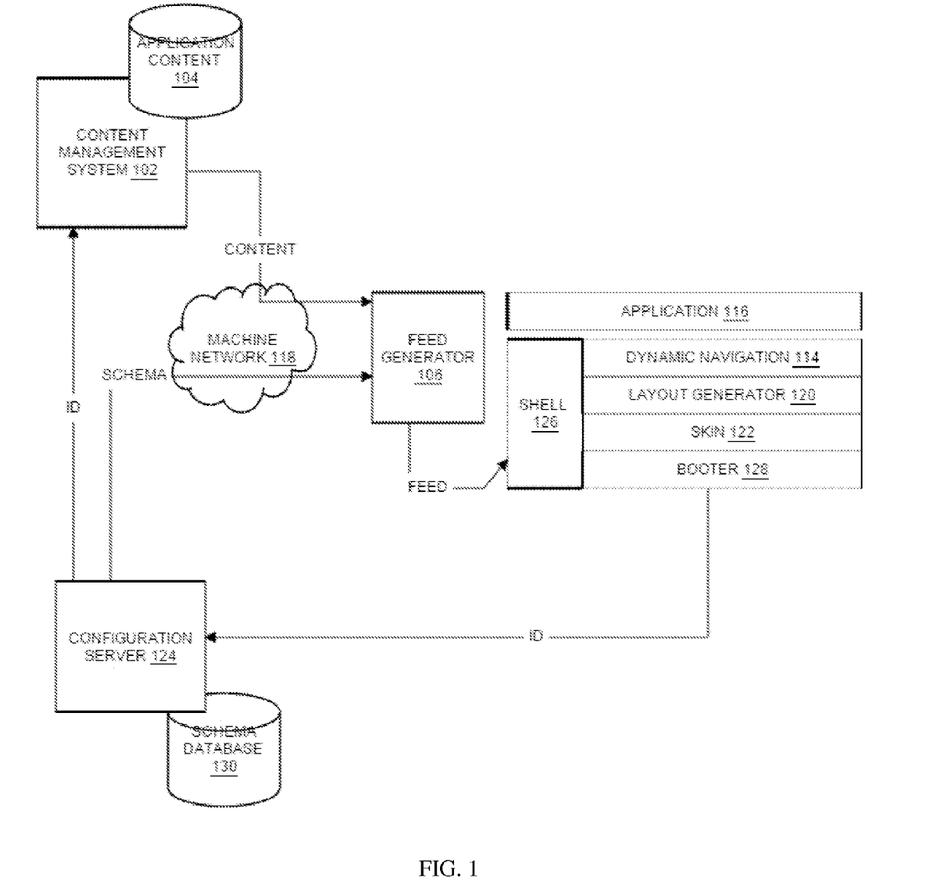
FIG. 1 illustrates an embodiment of machine system to configure and execute logic on different machine platforms.

FIG. 1 illustrates an embodiment of machine system to configure and execute logic on different machine platforms. The system enables a vast majority of application content, organization, and behavior to be specified independently of a particular machine platform, and further enables rapid deployment of application changes across platforms.

An application bootstrapper 128 identifies the application 116 to the configuration server 124. The identification (id) is applied to locate a feed schema for the application 116 in a schema database 130. The configuration server 124 applies the id to activate the content management system 102 which identifies and accesses application content 104 for the application 116. The content management system 102 and the configuration server 124 cooperatively interact with a feed generator 106 over a machine network 118 to create a feed for the application 116. The feed comprises content from the application content 104 inserted into the schema.

The schema is not analogous to a web page. The schema generally describes a set of particular page types but does not comprise specific layout or navigation/control information. Layout generation and navigation are implemented by platform-specific "shell" logic that mostly encapsulates the application 116 presentation and operation on the specific machine platform, utilizing a layout generator 120 and dynamic navigation 114 logic. Unlike a web page implemented in a web browser, the layout generator 120 and dynamic navigation 114 are specific to the machine platform, not the application 116. Logic implementing a skin 122 for all applications on the machine platform is also included in the shell 126. Furthermore, the schema is particularly adapted for applications (such as application 116) that provide for user interaction with streaming and/or downloaded audio and video content in particular.

A multi-platform application 116 may be configured to use different content on different machine platforms. For example, a particular grid layout may be utilized on the Xbox One but doesn't look acceptable on the Xbox 360, perhaps because flex grids are required to be narrow enough to fit on the screen on Xbox 360, but that restriction doesn't apply to the One. The system may be adapted to utilize different application content 104 in the same application 116 on different machine platforms in two ways.

In one embodiment, each application 116 is configured with a different content root that identifies the machine platform, where each root generates a different feed with different application content 104. In another embodiment, a single feed is generated for all machine platforms, wherein the feed comprises 'alternates' and 'platform specifies' to represent the content for all platforms in a single feed.

An example of the latter approach is given below for an item that has a different layout on Xbox 360 and Xbox One

```
<item>
  <title>This is my item</title>
  <layout platforms="xbox360">
    <colspan>2</colspan>
    <rowspan>2</rowspan>
    <alternate platforms="xbox1">
      <colspan>3</colspan>
    </alternate>
  </layout>
</item>
```

The schema for a feed may be configured to apply filters to displayed content under certain conditions. Filters may be utilized as a form of creating alternate content displays. For example, a schema may include a list of content, and two items may be configured to appear next to each other with mutually-exclusive filtering requirements. For example, a content item configured in the schema with platform="windows8" and styleIds="snap" may only be displayed on a Windows 8 application that's currently in snap mode. If the user takes the application out of snap mode, then the page may be refreshed and the user will see whatever alternate content or item is appropriate.

The resulting item will have a column span and row span of 2 on the 360, a column span of 3 and a (default) row span of 1 on the Xbox One, and no special layout at all on other machine platforms.

The schema may be configured to provide alternate content, or entire alternate objects such as pages, on different machine platforms. For example, different background images may be specified for a particular page on different machine platforms like so:

```
<background>
http://www.myserver.com/defaultbackgroundimage.png
<alternate platforms="firetv">http://www.myserver.com/
   firetvbackgroundimage.png</alternate>
</background>
```

The schema may be configured to utilize alternate content not only for different machine platforms, but also using styles. Styles may be applied as a filter to control the environmental circumstances under which items should be displayed. For example, an object with a style of "registered" may only be displayed if the machine executing the application 116 is registered with the configuration server 124. For example, a schema might be configured as follows to determine whether to display the user's watchlist, or a login page, like so:

```
<list2d styleIds="registered">
  <pointer>
    <target>longlist</target>
    <path>watchlist</path>
  <pointer>
  <alternate styleIds="unregistered">
    <dialog>
      <login>
        ...
      </login>
    </dialog>
```

```
    </alternate>
  <list2d>
```

In one embodiment the schema supports styles of "snap" and "unsnap" for use with machine platforms that support snap mode, which include Windows 8 and Xbox One. These styles may be applied to provide a page a completely different look and feel when the application 116 user interface has been snapped to one side of the machine display.

Figure 2:
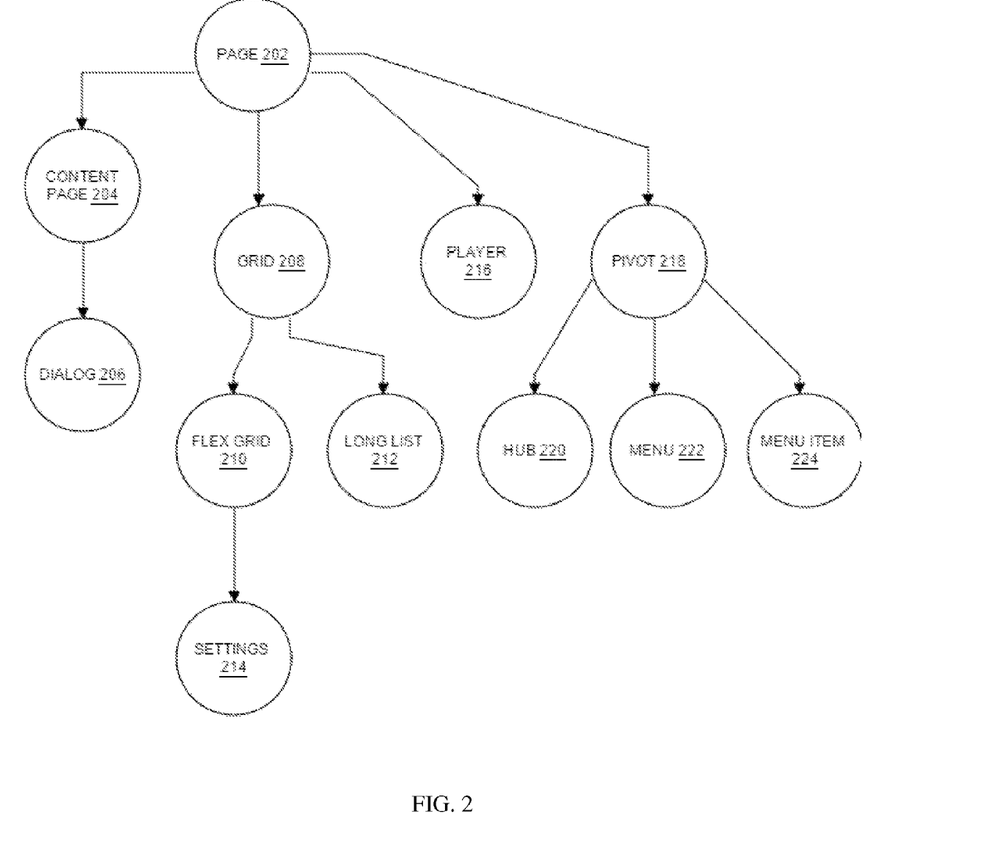
FIG. 2 illustrates an example of a page hierarchy.

If the user is already authenticated to the configuration server 124, their watchlist is displayed. Otherwise, a Dialog 206 page type is presented for them to log into the configuration server 124 and authenticate. Nested alternates are also supported. For example, the schema could be configured to display different Dialog 206 pages for Fire TV and Xbox360.

In one embodiment the schema supports styles of "snap" and "unsnap" for use with machine platforms that support snap mode, which include Windows 8 and Xbox One. These styles may be applied to provide a page a completely different look and feel when the application 116 user interface has been snapped to one side of the machine display.

FIG. 2 illustrates an example of a page hierarchy. A generic Page 202 type object provides a template for more specific page types, such as a Content Page 204, a Grid 208, a Pivot 218, and a Player 216. A Content Page 204 may act as a template for a Dialog 206. A Grid 208 may be a template for a Flex Grid 210 and a Long List 212. The Flex Grid 210 may be a template for a Settings 214 page. The Pivot 218 page may be a template for a Hub 220, a Menu 222, and a Menu Item 224. There are of course many possible page hierarchies of which FIG. 2 is one example.

Pages are atomic control templates for the dynamic navigation 114 logic. They're represented by a number of feed objects that correspond to different "shapes" of data. In the example of FIG. 2, but page types inherit from the generic Page 202 type. Each machine platform shell 126 logic has an equivalent of a master page mechanism that is able to display the content of a page inside a customizable set of chrome (the skin 122 logic) that handles displaying the basic features of pages such as background, logo, title, subtitle, any legend commands that might be specified, etc.

Page objects may be specified in pointers in the feed in two ways:

1. As an XML element (e.g. with the element name)
2. As a string of the format {page type}://{path}?{params}

{Page Type} specifies the action that should be taken when the pointer is activated. This may be a navigation action command to the dynamic navigation 114 logic that specifies a page type, such as "longlist", "detail", or "player". In some cases {Page Type} specifies not a page type, but a more immediate action, such as "share", "togglewatchlist", or "register". In one embodiment, all commands to the dynamic navigation 114 logic that may be initiated by a user action are captured in a global table of possible actions, and {Page Type} is the index into that table.

Path and params can have different meanings for different {Page Types}. In one embodiment they are used to form a URL that will be invoked by the dynamic navigation 114 logic. For example, to browse a long list of horror movies sorted by release date the pointer might resemble something like this: "longlist://channels/allVideos?genre=horror&sort=release"

The XML form of this pointer would look like this:
```
<pointer>
    <target>longlist</target>
    <path>channels/allVideos</path>
    <params>genre=horror&sort=release</params>
</pointer>
```

The shell 126 logic for a particular machine platform may comprise a set of tools associated with various Page 202 objects. This set of tools may be referred to as a palette. For example, a palette may comprise a set of buttons and filters displayed alongside content of all or some page types. What types of buttons and filters comprise a palette, and where and how it is displayed, is configured into the feed and implemented by the shell 126 and/or layout generator 120. All page types support specifying a palette in the feed, although particular shell 126 logic may expose it differently for different page types, depending on the machine platform. For example, Fire TV and Windows 8 may support displaying a palette only for Long List 212 type pages; this is because the designs for those platforms only provide space for it in that one page type. On Fire TV, pressing a menu key could bring up the palette in a dialog if the page type doesn't display it otherwise. On the other hand, Xbox 360 may comprise a more rigid generic (Page 202 template) that displays the palette in the same way for all pages.

Items may be separated into groups that can be used to compose grid pages. In one implementation there are several kinds of groups:

- A group created with the <items> element is a raw group with no additional formatting applied
- The <slots> and <navigation> elements apply a platform-specific default width and height; typically, <navigation> contains square (or almost-square) buttons, while <slots> contains 16:9 items. For example, on the Xbox 360, items in a <slots> group are 220×124, and items in a <navigation> group> are 124×124.
- A <watchlist> group will be automatically populated by items from the local watchlist specified by the <name> element.

A Pivot 218 page object encapsulates a list of other pages, and generally is configured to enable the user to navigate between the pages. A Pivot 218 page is configured to display a list of content items one at a time or side by side (depending on the machine platform and style), along with a header to identify the content items. A Pivot 218 may be configured similar to a tab control, with the headers all fully visible along the top of the page, and the currently selected item fully visible in the center of the page. One difference is that a Pivot 218 may also provide peek functionality, where the items to the immediate left and right of the selected item is partially visible, shrunk down and slightly transparent, along the sides. This has the side effect of requiring each item to fit entirely on the screen both horizontally and vertically, which is why they may be Flex Grid 210 page objects, which do not support scrolling.

A Menu 222 page object may be typically formatted with the headers arranged vertically along the left, while the rest of the space is occupied by the selected item. The Menu 222 is a type of Pivot 218 page that may host other Pivot 218 pages and Menu Item 224 page types.

All subtypes of the Pivot 218 page object inherit from Pivot 218 type. The various sub-types of Pivot 218 allow the shell 126 and layout generator 120 on different machine platforms to distinguish between different styles of Pivot 218 pages on platforms that support multiple styles. If a particular platform only supports one style, then the shell 126 and/or layout generator 120 of that platform may be configured to respond to all types of Pivot 218 page as being the supported type.

A Hub 220 is a type of Pivot 218 page configured such that the headers are visible along the top in the same way as a Pivot 218 page, but there's no definitive selected item; the user may scroll horizontally to the content they want to see. As a result, items in a Hub 220 may be as wide as they need to be (within reasonable limits for a good user experience), and should not scroll independently. As a result, Hub 220 pages also typically use Flex Grid 210 pages to organize their items.

The Menu 222 page object is typically formatted with the headers arranged vertically along the left, while the rest of the space is occupied by the selected item. A Menu Item 224 is typically displayed with each item stacked vertically, with vertical scrolling if the items don't fit. The header may be configured directly above the content enabling scrolling horizontally through each item. Or, the headers may be displayed on "tombstone" items to the left of the items themselves, and selecting a list navigates to the item as a separate page that fills the screen. Items on the Menu Item 224 page may be Long List 212 type pages.

A Player 216 page type is configured to host a video player. The Player 216 page object may be configured with the same base page properties as other page types (background, logo, etc.), but some machine platforms may choose to have a default style that ignores most of them in favor of simply rendering the video full-screen. In one embodiment, the Player 216 comprises a single item that specifies the actual content to play; in other embodiments, the Player 216 comprises a list of content to play.

A Content Page 204 is configured to display a carousel. A carousel is a type of item that hosts a list of other items and cycles through them one at a time, in a rotating fashion. A carousel in the schema does not include any pointers. The feed generator 106 associates pointers in the feed to the items inside the carousel to determine what should happen when the user selects the items.

Items are either content or action controls. They are the atomic unit of focus, and represent individual pieces of content or controls that can be configured into a Content Page 204 (or Grid 208). They are the things that users can select and click on. A Content Page 204 is a generic container that may contain items, for example in the form of carousels. A Content Page 204 may be utilized to provide page metadata (logo, background, page title, etc.) to wrap around an item.

Figure 3:
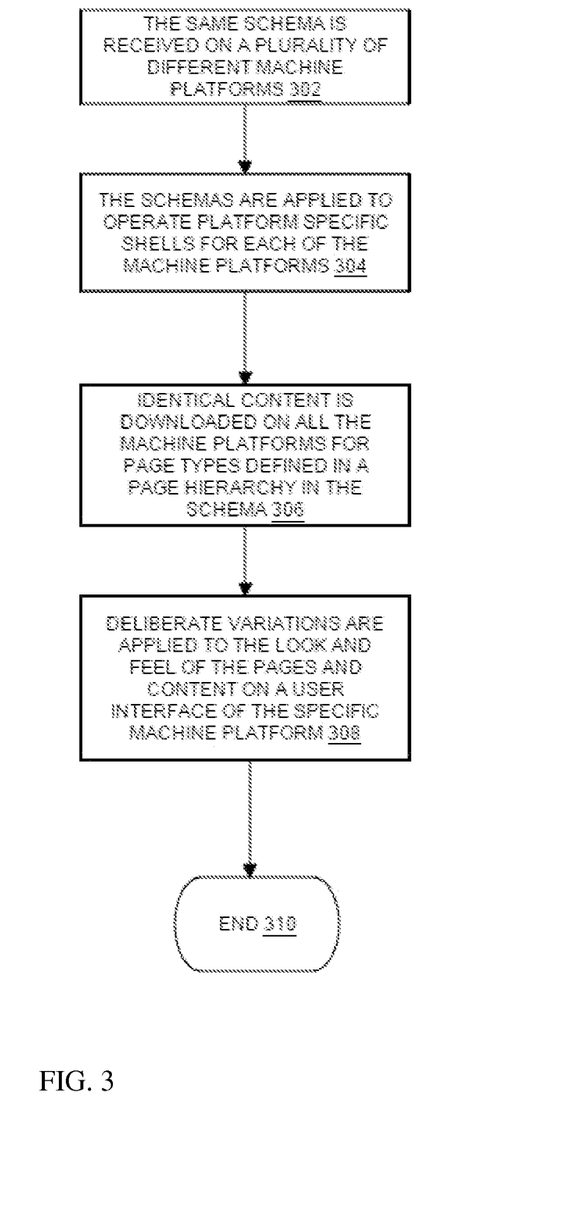
FIG. 3 illustrates a process of operating application logic on different machine platforms

FIG. 3 illustrates a process of operating application logic on different machine platforms. The same schema is received on a plurality of different machine platforms 302. The schemas are applied to operate platform specific shells for each of the machine platforms 304. Identical content is downloaded on all the machine platforms for page types defined in a page hierarchy in the schema 306. Deliberate variations are applied to the look and feel of the pages and content on a user interface of the specific machine platform 308. The process then concludes (end 310).

Figure 4:
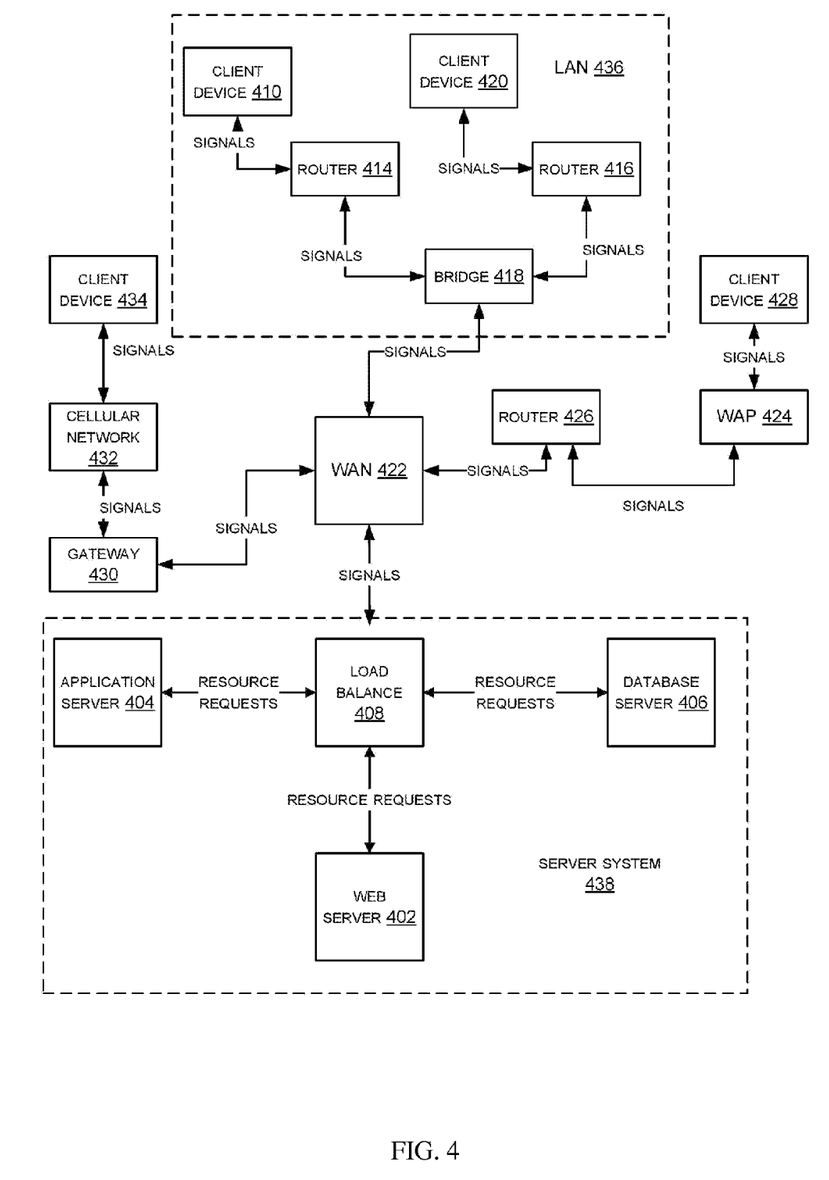
FIG. 4 illustrates an embodiment of a machine system for implementing the system of FIG. 1

FIG. 4 illustrates an embodiment of a machine system for implementing the system of FIG. 1. Several network access technologies between client devices and server resources are illustrated, including cellular network 432, LAN 436, and WAP 424. Signals representing server resource requests are output from client devices 410, 420, 428, and 434 to the various access networks, from which they are propagated to a WAN 422 (e.g., the Internet) and from there to a server system. These signals are typically encoded into standard protocols such as Internet Protocol (IP), TCP/IP, and HTTP. When the clients are part of a LAN 436, the signals may be propagated via one or more router 414 416 and a bridge 418. A router 426 may propagate signals from the WAP 424 to the WAN 422. A gateway 430 may propagate signals from the cellular network 432 to the WAN 422. The server system 438 in this example comprises a number of separate server devices, typically each implemented in the separated machine, although this is not necessarily the case. The signals from the client devices are provided via a load balancing server 408 to one or more application server 404 and one or more database server 416. Load balancing server 408 maintains an even load distribution to the other server, including web server 402, application server 404, and database server 406. Each server in the drawing may represent in effect multiple servers of that type. The load balancing server 408, application server 404, and database server 406 may collectively implement an embodiment of the system described herein. The signals applied to the database server 406 may cause the database server 406 to access and certain memory addresses, which correlates to certain rows and columns in a memory device. These signals from the database server 406 may also be applied to application server 404 via the load balancing server 408. Signals applied by the application server 404, via the load balancing server 408, to the web server 402, may result in web page modifications which are in turn communicated to a client device, as described herein in regards to user interface and interaction signals to and from a client device. The system described herein may thus be implemented as devices coordinated on a LAN, or over a wide geographical area utilizing a WAN or cellular network, or over a limited area (room or house or store/bar) utilizing a WAP. Features of client logic to interact with the described system may thus be implemented, for example, as an application (app) on a mobile phone interfacing to a network in one of the manners illustrated in this figure. The system described herein may be implemented as a pure or hybrid peer to peer system in a local or widely distributed area.

Figure 5:
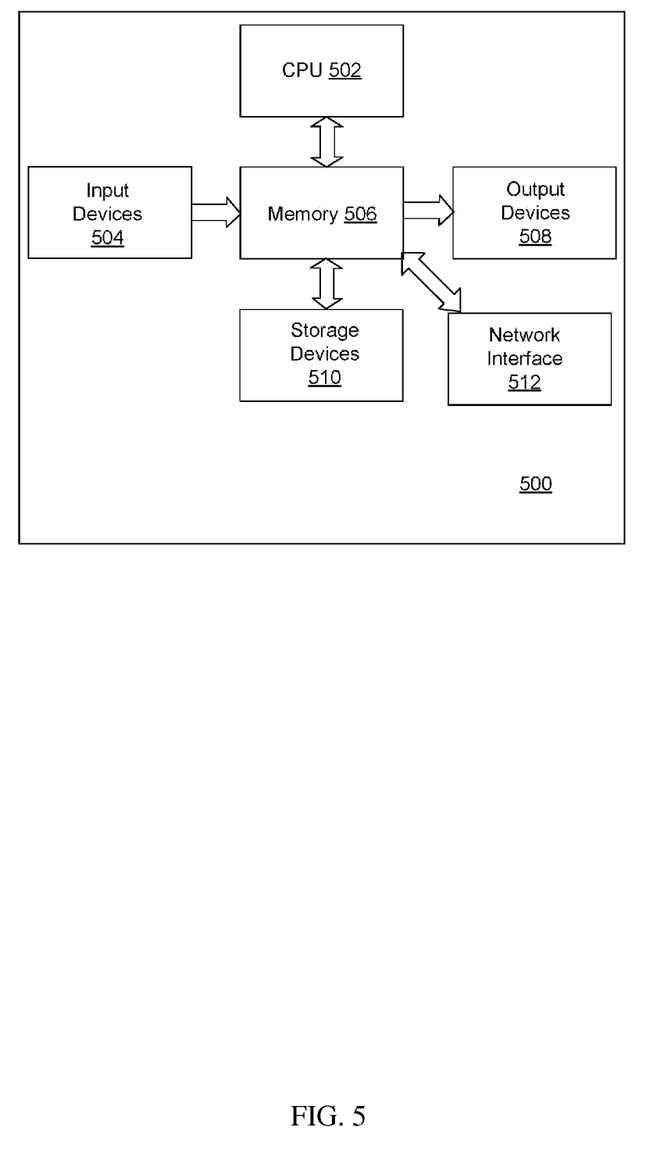
FIG. 5 illustrates an embodiment of a machine platform.

FIG. 5 illustrates an embodiment of a machine platform. Input devices 504 comprise transducers that convert physical phenomenon into machine internal signals, typically electrical, optical or magnetic signals. Signals may also be wireless in the form of electromagnetic radiation in the radio frequency (RF) range but also potentially in the infrared or optical range. Examples of input devices 504 are keyboards which respond to touch or physical pressure from an object or proximity of an object to a surface, mice which respond to motion through space or across a plane, microphones which convert vibrations in the medium (typically air) into device signals, scanners which convert optical patterns on two or three dimensional objects into device signals. The signals from the input devices 504 are provided via various machine signal conductors (e.g., busses or network interfaces) and circuits to memory devices 506. The memory devices 506 is typically what is known as a first or second level memory device, providing for storage (via configuration of matter or states of matter) of signals received from the input devices 504, instructions and information for controlling operation of the CPU 502, and signals from storage devices 510. Information stored in the memory devices 506 is typically directly accessible to processing logic 502 of the device. Signals input to the device cause the reconfiguration of the internal material/energy state of the memory device 506, creating in essence a new machine configuration, influencing the behavior of the device 500 by affecting the behavior of the CPU 502 with control signals (instructions) and data provided in conjunction with the control signals. Second or third level storage devices 510 may provide a slower but higher capacity machine memory capability. Examples of storage devices 510 are hard disks, optical disks, large capacity flash memories or other non-volatile memory technologies, and magnetic memories. The processing logic 502 may cause the configuration of the memory 506 to be altered by signals in storage devices 510. In other words, the CPU 502 may cause data and instructions to be read from storage devices 510 in the memory 506 from which may then influence the operations of CPU 502 as instructions and data signals, and from which it may also be provided to the output devices 508. The CPU 502 may alter the content of the memory of 506 by signaling to a machine interface of memory 506 to alter the internal configuration, and then converted signals to the storage devices 510 to alter its material internal configuration. In other words, data and instructions may be backed up from memory 506, which is often volatile, to storage devices 510, which are often non-volatile. Output devices 508 are transducers which convert signals received from the memory 506 into physical phenomenon such as vibrations in the air, or patterns of light on a machine display, or vibrations (i.e., haptic devices) or patterns of ink or other materials (i.e., printers and 3-D printers). Communication interface 512 receives signals from the memory 506 and converts them into electrical, optical, or wireless signals to other machines, typically via a machine network. Communication interface 512 also receives signals from the machine network and converts them into electrical, optical, or wireless signals to the memory 506.

Embodiments of an application configuration system have been described. The following claims are directed to said embodiments, but do not preempt or encompass application configuration in the abstract. Those having skill in the art will recognize numerous other approaches to application configuration are possible and/or utilized commercially, and which do not utilize the inventive processes and specific interaction of those processes of the claims as an integrated whole, thus precluding any possibility of preemption or encompassing of application configuration in the abstract. The claimed system is not only configured for non-trivial and unconventional processing, it also improves, in one or more specific ways, the operation of a machine system for application configuration, and thus distinguishes from other approaches to the same problem/process in how its physical arrangement of a machine system determines the system's operation and ultimate effects on the material environment. Although that any system, process, apparatus or material may ultimately, with enough intellectual reduction, be reduced to basic or fundamental components (e.g., a computer may be reduced to circuits and conductors, a new medicine reduced to known atoms, etc.), described herein are novel and inventive configurations and interoperations of any such components to enable and implement novel and inventive devices and systems of devices that specifically improve the functioning of application configuration (application in a specific technology/field) computer system. The claims are not a mere general linking of an abstract idea to a technology environment, and require more than a generic computer performing generic functions that are well understood and routine and conventional, and previously known to the industry.

It will be further recognized that the claims do not preempt or wholly encompass any fundamental economic practice, idea in and of itself (e.g., a principle, original cause, or motive), or pure mathematical formula or relationship.

References to "one embodiment" or "an embodiment" do not necessarily refer to the same embodiment, although they may. Unless the context clearly requires otherwise, throughout the description and the claims, the words "comprise," "comprising," and the like are to be construed in an inclusive sense as opposed to an exclusive or exhaustive sense; that is to say, in the sense of "including, but not limited to." Words using the singular or plural number also include the plural or singular number respectively, unless expressly limited to a single one or multiple ones. Additionally, the words "herein," "above," "below" and words of similar import, when used in this application, refer to this application as a whole and not to any particular portions of this application. When the claims use the word "or" in reference to a list of two or more items, that word covers all of the following interpretations of the word: any of the items in the list, all of the items in the list and any combination of the items in the list, unless expressly limited to one or the other.

"Logic" refers to machine memory circuits, machine readable media, and/or circuitry which by way of its material and/or material-energy configuration comprises control and/or procedural signals, and/or settings and values (such as resistance, impedance, capacitance, inductance, current/voltage ratings, etc.), that may be applied to influence the operation of a device. Magnetic media, electronic circuits, electrical and optical memory (both volatile and nonvolatile), and firmware are examples of logic. Logic specifically excludes pure signals or software per se (however does not exclude machine memories comprising software and thereby forming configurations of matter).

Those skilled in the art will appreciate that logic may be distributed throughout one or more devices, and/or may be comprised of combinations memory, media, processing circuits and controllers, other circuits, and so on. Therefore, in the interest of clarity and correctness logic may not always be distinctly illustrated in drawings of devices and systems, although it is inherently present therein.

The techniques and procedures described herein may be implemented via logic distributed in one or more computing devices. The particular distribution and choice of logic will vary according to implementation.

Those having skill in the art will appreciate that there are various logic implementations by which processes and/or systems described herein can be effected (e.g., hardware, software, and/or firmware), and that the preferred vehicle will vary with the context in which the processes are deployed. "Software" refers to logic that may be readily readapted to different purposes (e.g. read/write volatile or nonvolatile memory or media). "Firmware" refers to logic embodied as read-only memories and/or media. Hardware refers to logic embodied as analog and/or digital circuits. If an implementer determines that speed and accuracy are paramount, the implementer may opt for a hardware and/or firmware vehicle; alternatively, if flexibility is paramount, the implementer may opt for a solely software implementation; or, yet again alternatively, the implementer may opt for some combination of hardware, software, and/or firmware. Hence, there are several possible vehicles by which the processes described herein may be effected, none of which is inherently superior to the other in that any vehicle to be utilized is a choice dependent upon the context in which the vehicle will be deployed and the specific concerns (e.g., speed, flexibility, or predictability) of the implementer, any of which may vary. Those skilled in the art will recognize that optical aspects of implementations may involve optically-oriented hardware, software, and or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood as notorious by those within the art that each function and/or operation within such block diagrams, flowcharts, or examples can be implemented, individually and/or collectively, by a wide range of hardware, software, firmware, or virtually any combination thereof. Several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in standard integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and/or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies equally regardless of the particular type of signal bearing media used to actually carry out the distribution. Examples of a signal bearing media include, but are not limited to, the following: recordable type media such as floppy disks, hard disk drives, CD ROMs, digital tape, flash drives, SD cards, solid state fixed or removable storage, and computer memory.

In a general sense, those skilled in the art will recognize that the various aspects described herein which can be implemented, individually and/or collectively, by a wide range of hardware, software, firmware, or any combination thereof can be viewed as being composed of various types of "circuitry." Consequently, as used herein "circuitry" includes, but is not limited to, electrical circuitry having at least one discrete electrical circuit, electrical circuitry having at least one integrated circuit, electrical circuitry having at least one application specific integrated circuit, circuitry forming a general purpose computing device configured by a computer program (e.g., a general purpose computer configured by a computer program which at least partially carries out processes and/or devices described herein, or a microprocessor configured by a computer program which at least partially carries out processes and/or devices described herein), circuitry forming a memory device (e.g., forms of random access memory), and/or circuitry forming a communications device (e.g., a modem, communications switch, or optical-electrical equipment).

Those skilled in the art will recognize that it is common within the art to describe devices and/or processes in the fashion set forth herein, and thereafter use standard engineering practices to integrate such described devices and/or processes into larger systems. That is, at least a portion of the devices and/or processes described herein can be integrated into a network processing system via a reasonable amount of experimentation.

What is claimed is:
1. A method comprising:
  receiving via a network machine interface a schema defining a hierarchy of page objects for application logic on a plurality of different machine platforms;
  applying the schema to operate shell logic specific to a particular machine platform comprising the network machine interface via which the schema was received to provide a look and feel for application logic native to the particular machine platform; and cooperatively operating layout logic and navigation logic of the shell logic to cause the look and feel of the application logic native to the particular machine platform as defined by the hierarchy of page objects to be inconsistent on the plurality of different machine platforms;

the schema configured to operate the shell logic to cause the variations in the look and feel of the application logic native to the particular machine platform according to at least a registered mode of operation of the particular machine platform and a snap mode of operation of the particular machine platform.

2. The method of claim 1, further comprising:
operating skin logic in cooperation with the layout logic to cause the look and feel of the application logic native to the particular machine platform as defined by the hierarchy of page objects to be inconsistent on the plurality of different machine platforms.

3. The method of claim 1, further comprising:
operating the shell logic to deliberately ignore variations between page types of the hierarchy of page objects.

4. The method of claim 1, further comprising:
the schema configured to operate the shell logic to cause variations in the look and feel of the application logic native to the particular machine platform according to a mode of operation of the particular machine platform.

5. The method of claim 1, further comprising:
the schema configured to operate the shell logic to cause variations in the look and feel of the application logic native to the particular machine platform by displaying alternative content for different ones of the plurality of different machine platforms.

6. The method of claim 5, further comprising:
the alternative content for different ones of the plurality of different machine platforms comprising alternative page objects.

7. A computing apparatus including a processor and a memory, comprising:
a network machine interface;
logic to operate the network machine interface to receive a schema defining a hierarchy of page objects for application logic on a plurality of different machine platforms;
logic to apply the schema to operate shell logic specific to a particular machine platform comprising the network machine interface via which the schema was received to provide a look and feel for application logic native to the particular machine platform; and
layout logic and navigation logic of the shell logic configured to cooperate to cause the look and feel of the application logic native to the particular machine platform as defined by the hierarchy of page objects to be inconsistent on the plurality of different machine platforms;
the schema configured to operate the shell logic to cause the variations in the look and feel of the application logic native to the particular machine platform according to at least a registered mode of operation of the particular machine platform and a snap mode of operation of the particular machine platform.

8. The computing apparatus of claim 7, further comprising:
skin logic configured to operate in cooperation with the layout logic to cause the look and feel of the application logic native to the particular machine platform as defined by the hierarchy of page objects to be inconsistent on the plurality of different machine platforms.

9. The computing apparatus of claim 7, further comprising:
the shell logic configured to deliberately ignore variations between page types of the hierarchy of page objects.

10. The computing apparatus of claim 7, further comprising:
the schema configured to operate the shell logic to cause variations in the look and feel of the application logic native to the particular machine platform according to a mode of operation of the particular machine platform.

11. The computing apparatus of claim 7, further comprising:
the schema configured to operate the shell logic to cause variations in the look and feel of the application logic native to the particular machine platform by displaying alternative content for different ones of the plurality of different machine platforms.

12. The computing apparatus of claim 11, further comprising:
the alternative content for different ones of the plurality of different machine platforms comprising alternative page objects.

13. A non-transitory computer-readable storage medium having stored thereon instructions including instructions that, when executed by a processor, configure the processor to perform a method comprising:
receiving via a network machine interface a schema defining a hierarchy of page objects for application logic on a plurality of different machine platforms;
applying the schema to operate shell logic specific to a particular machine platform comprising the network machine interface via which the schema was received to provide a look and feel for application logic native to the particular machine platform; and
cooperatively operating layout logic and navigation logic of the shell logic to cause the look and feel of the application logic native to the particular machine platform as defined by the hierarchy of page objects to be inconsistent on the plurality of different machine platforms;
the schema configured to operate the shell logic to cause the variations in the look and feel of the application logic native to the particular machine platform according to at least a registered mode of operation of the particular machine platform and a snap mode of operation of the particular machine platform.

14. The non-transitory computer-readable storage medium of claim 13, the method further comprising:
operating skin logic in cooperation with the layout logic to cause the look and feel of the application logic native to the particular machine platform as defined by the hierarchy of page objects to be inconsistent on the plurality of different machine platforms.

15. The non-transitory computer-readable storage medium of claim 13, the method further comprising:
operating the shell logic to deliberately ignore variations between page types of the hierarchy of page objects.

16. The non-transitory computer-readable storage medium of claim 13, the method further comprising:
the schema configured to operate the shell logic to cause variations in the look and feel of the application logic native to the particular machine platform according to a mode of operation of the particular machine platform.

17. The non-transitory computer-readable storage medium of claim 13, the method further comprising:
the schema configured to operate the shell logic to cause variations in the look and feel of the application logic native to the particular machine platform by displaying alternative content for different ones of the plurality of different machine platforms.

* * * * *